United States Patent
Fang et al.

(10) Patent No.: US 11,778,600 B2
(45) Date of Patent: Oct. 3, 2023

(54) RESOURCE ALLOCATION METHOD AND DEVICE

(71) Applicant: ZTE CORPORATION, Guangdong (CN)

(72) Inventors: Huiying Fang, Guangdong (CN); Weiwei Yang, Guangdong (CN); Bo Dai, Guangdong (CN)

(73) Assignee: ZTE CORPORATION

( * ) Notice: Subject to any disclaimer, the term of this patent is extended or adjusted under 35 U.S.C. 154(b) by 324 days.

(21) Appl. No.: 16/967,489

(22) PCT Filed: Feb. 12, 2019

(86) PCT No.: PCT/CN2019/074853
§ 371 (c)(1),
(2) Date: Aug. 5, 2020

(87) PCT Pub. No.: WO2019/154427
PCT Pub. Date: Aug. 15, 2019

(65) Prior Publication Data
US 2021/0219290 A1    Jul. 15, 2021

(30) Foreign Application Priority Data
Feb. 12, 2018   (CN) .......................... 201810147407.5

(51) Int. Cl.
*H04L 5/00*         (2006.01)
*H04W 72/0453*      (2023.01)
(Continued)

(52) U.S. Cl.
CPC ........... *H04W 72/0453* (2013.01); *H04L 5/00* (2013.01); *H04L 5/0044* (2013.01);
(Continued)

(58) Field of Classification Search
CPC .......... H04W 72/0453; H04W 72/042; H04W 72/0493; H04W 72/1278; H04W 72/1263;
(Continued)

(56) References Cited

U.S. PATENT DOCUMENTS

2018/0069672 A1*  3/2018  Horiuchi ............... H04L 5/0007
2018/0227897 A1   8/2018  Yeo et al.
(Continued)

FOREIGN PATENT DOCUMENTS

CN          106961734          7/2017
CN          107534978          1/2018
(Continued)

OTHER PUBLICATIONS

Patent Cooperation Treaty (PCT), International Search Report and Written Opinion for Application PCT/CN2019/074853 filed on Feb. 12, 2019, dated Apr. 23, 2019, International Searching Authority, CN.
(Continued)

*Primary Examiner* — Omar J Ghowrwal
(74) *Attorney, Agent, or Firm* — McDonald Hopkins LLC (57) ABSTRACT

Provided are a resource allocation method and device. The resource allocation method includes: sending resource position indication information, wherein the resource position indication information carries position information of a physical resource block (PRB) resource within a narrowband and shift offset information of the PRB resource within the narrowband, or the resource position indication information carries position information of a PRB resource within the narrowband and position information of a PRB resource out of the narrowband.

20 Claims, 2 Drawing Sheets

(51) Int. Cl.
*H04W 72/23* (2023.01)
*H04W 72/53* (2023.01)
*H04W 72/20* (2023.01)
*H04W 72/1263* (2023.01)

(52) U.S. Cl.
CPC ....... *H04L 5/0091* (2013.01); *H04W 72/1263* (2013.01); *H04W 72/20* (2023.01); *H04W 72/23* (2023.01); *H04W 72/53* (2023.01)

(58) Field of Classification Search
CPC . H04W 72/1289; H04W 72/23; H04W 72/20; H04W 72/53; H04L 5/00; H04L 5/0091; H04L 5/0044
See application file for complete search history.

(56) References Cited

U.S. PATENT DOCUMENTS

| | | | | |
|---|---|---|---|---|
| 2019/0222405 | A1* | 7/2019 | Wong | H04L 5/08 |
| 2019/0253100 | A1* | 8/2019 | Liu | H04L 5/0044 |
| 2020/0112944 | A1* | 4/2020 | Jiang | H04W 76/27 |

FOREIGN PATENT DOCUMENTS

| | | |
|---|---|---|
| WO | 2017014613 | 1/2017 |
| WO | 20170133339 | 8/2017 |
| WO | 2017155324 | 9/2017 |

OTHER PUBLICATIONS

Australian Patent Office, Examination Report No. 1 for Application No. 2019218524, report dated Feb. 17, 2021.
Intellectual Property India, Examination Report for Application No. 202027037918, report dated Sep. 10, 2021.
Korean Intellectual Property Office, First Office Action for Application No. 10-2020-7026365, report dated Aug. 24, 2022.
Huawei, HiSilicon: "Resource allocation for supporting larger PDSCH channel bandwidth," 3GPP Meeting: R1-1701758, Athens, Greece. (2017).
Ericsson: "Flexible PDSCH/PUSCH resource allocation for MTC," 3GPP Meeting; R1-1717001, Prague, Czech Republic. (2017).

* cited by examiner

| PRBs | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| RBGs | | | 1 | | 2 | | | | 4 | | 5 | | 6 | | 7 |
| NBs | | | 0 | | | | | | | 1 | | | | | |

FIG. 1

Send resource position indication information where the resource position indication information carries position information of a physical resource block (PRB) resource within a narrowband and shift offset information of the PRB resource within the narrowband, or the resource position indication information carries position information of a PRB resource within the narrowband and position information of a PRB resource out of the narrowband  — S210

Determine a position of an actually allocated resource according to the position information of the PRB resource within the narrowband carried in the resource position indication information and the shift offset information of the PRB resource within the narrowband carried in the resource position indication information; or determine the position of the actually allocated resource according to the position information of the PRB resource within the narrowband and the position information of the PRB resource out of the narrowband carried in the resource position indication information  — S220

RESOURCE ALLOCATION METHOD AND DEVICE

CROSS-REFERENCE TO RELATED APPLICATION

This is a National Stage Application, filed under U.S.C. 371, of International Application No. PCT/CN2019/074853 filed on Feb. 12, 2019, which claims priority to Chinese patent application No. 201810147407.5 filed on Feb. 12, 2018, disclosure of which i& are incorporated herein by reference in their entirety.

TECHNICAL FIELD

The present disclosure relates to the field of wireless communication technology, for example, to a resource allocation method and device.

BACKGROUND

Machine Type Communications (MTC), also referred to as Machine to Machine (M2M) Communications, is the primary application mode of the Internet of Things in the current stage. Currently, MTC devices deployed on the market are mainly based on the Global System of Mobile communication (GSM). In recent years, more and more mobile operators choose Long Term Evolution/Advanced Long-Term Evolution (LTE/LTE-A) as the evolution direction of the future broadband wireless communication system due to the high spectral efficiency of the LTE/LTE-A. MTC multi-type data services based on LTE/LTE-A will also be more attractive.

A minimum resource allocation granularity of the resource allocation of a Physical Downlink Shared Channel (PDSCH)/Physical Uplink Shared Channel (PUSCH) of a related MTC terminal (Rel-13 (version 13) MTC terminal) is one Physical Resource Block (PRB), where one physical resource block is formed by 12 subcarriers in frequency domain. The overhead of a PUSCH resource allocation field in a coverage enhancement mode A (CE mode A) is $$\left\lceil \log_2\left(\left\lfloor \frac{N_{RB}^{UL}}{6} \right\rfloor\right)\right\rceil + 5$$

bits, where $N_{RB}^{UL}$ is the number of uplink physical resource blocks. The overhead of the PDSCH resource allocation field is $$\left\lceil \log_2\left(\left\lfloor \frac{N_{RB}^{DL}}{6} \right\rfloor\right)\right\rceil + 5,$$

where $N_{RB}^{DL}$ is the number of downlink physical resource blocks; the overhead of the PUSCH resource allocation field in a coverage enhancement mode B (CE mode B) is $$\left\lceil \log_2\left(\left\lfloor \frac{N_{RB}^{UL}}{6} \right\rfloor\right)\right\rceil + 3$$

bits, and the overhead of the PDSCH resource allocation field is $$\left\lceil \log_2\left(\left\lfloor \frac{N_{RB}^{DL}}{6} \right\rfloor\right)\right\rceil + 1.$$

Figure 1:
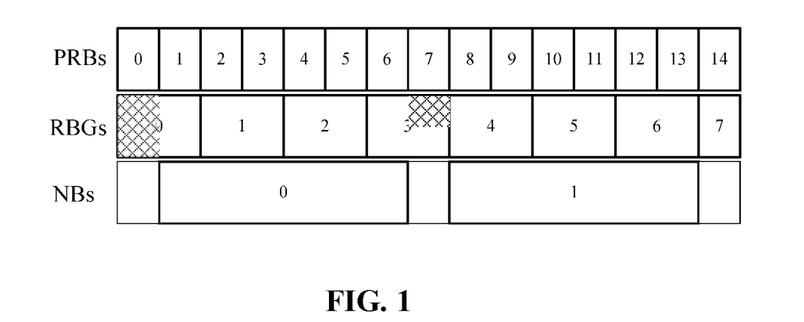
FIG. 1 is a schematic diagram for a resource allocation slice in the related art.

Such resource allocation method can only be performed within a narrowband, and since the traditional LTE resource allocation is performed according to the resource block groups, the size of a resource block group (RBG) (the RBG includes 2 PRBs for a 3/5 MHz system bandwidth; the RBG includes 3 PRBs for a 10 MHz system bandwidth, the RBG includes 4 PRBs for a 15/20 MHz system bandwidth) and the size of a narrowband (6 PRBs) are inconsistent, causing that the edge of the narrowband may not be aligned with the RBG, some PRBs may not be allocated, and leading to resource allocation fragmentation. As shown in FIG. 1, taking the system bandwidth with 3 MHz as an example, one RBG includes 2 consecutive PRBs, and one narrowband includes 6 consecutive PRBs. If narrowband 0 has been allocated to the terminal, then PRB 0 and PRB 7 may no longer be allocated to the terminal, leading to resource allocation fragmentation.

At present, there is no solution for reducing the resource allocation fragmentation.

SUMMARY

The present application provides a resource allocation method and device, which can implement a more flexible narrowband resource allocation strategy, thereby improving the resource allocation flexibility of narrowband user equipment.

The embodiment of the present disclosure provides a resource allocation method, including steps described below.

Resource position indication information is sent, where the resource position indication information carries position information of a physical resource block (PRB) resource within a narrowband and shift offset information of the PRB resource within the narrowband, or the resource position indication information carries position information of a PRB resource within the narrowband and position information of a PRB resource out of the narrowband.

The embodiment of the present disclosure provides a resource allocation device, including an information sending module and a resource allocation module.

The information sending module is configured to send resource position indication information, wherein the resource position indication information carries position information of a physical resource block (PRB) resource within a narrowband and shift offset information of the PRB resource within the narrowband, or the resource position indication information carries position information of a PRB resource out of the narrowband and the position information of the PRB resource within the narrowband.

The resource allocation module is configured to determine a position of an actually allocated resource according to the position information of the PRB resource within the narrowband carried in the resource position indication information and the shift offset information of the PRB resource within the narrowband carried in the resource position indication information; or determine a position of an actually allocated resource according to position information of the PRB resource within the narrowband and the position information of the PRB resource out of the narrowband carried in the resource position indication information.

The embodiment of the present disclosure provides a resource allocation device, which includes: a memory, a processor and a resource allocation program stored in the memory and executable on the processor, where the resource allocation program, when executed by the processor, implements the resource allocation method described above.

The embodiment of the present application provides a computer-readable storing a resource allocation program, wherein the resource allocation program, when executed by a processor, implements the resource allocation method described above.

BRIEF DESCRIPTION OF DRAWINGS

FIGS. 4(*a*) and 4(*b*) are resource allocation schematic diagrams of PRB offset for reducing fragmentation in example 1 of the present disclosure.

DETAILED DESCRIPTION

Embodiments of the present disclosure will be described hereinafter in detail with reference to the drawings. It is to be noted that if not in collision, the embodiments and features therein of the present disclosure may be combined with each other.

Embodiment 1

Figure 2:
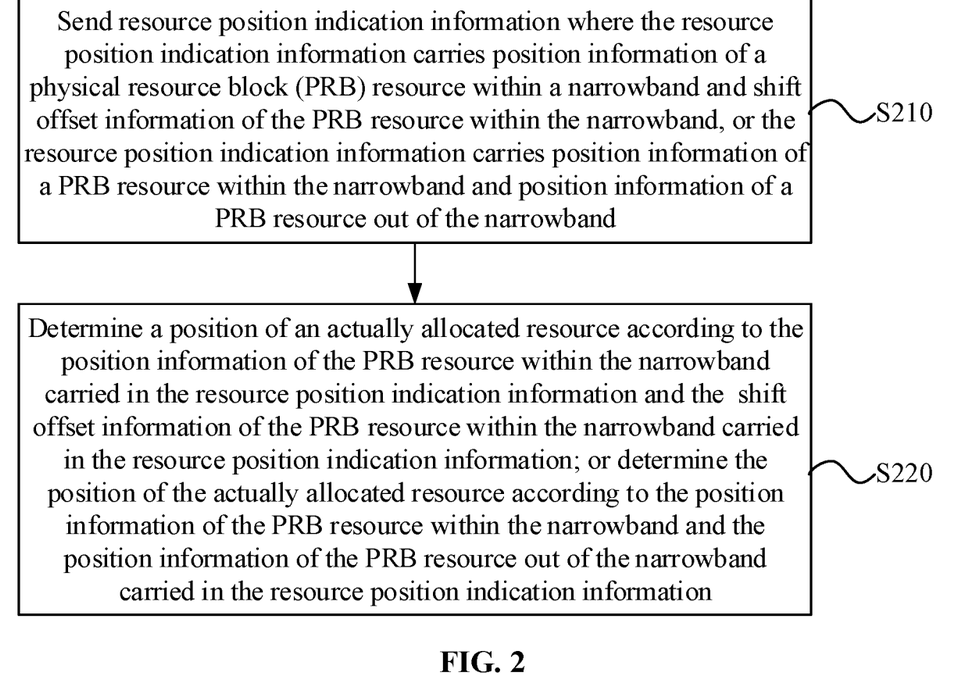
FIG. 2 is a flowchart of a resource allocation method according to embodiment one of the present disclosure.

As shown in FIG. 2, an embodiment of the present disclosure provides a resource allocation method, including: a step S210 and a step S220.

In step S210: resource position indication information is sent, where the resource position indication information carries position information of a physical resource block (PRB) resource within a narrowband and shift offset information of the PRB resource within the narrowband, or the resource position indication information carries position information of the PRB resource within the narrowband and position information of a PRB resource out of the narrowband.

In step S220, a position of an actually allocated resource is determined according to the position information of the PRB resource within the narrowband carried in the resource position indication information and the shift offset information of the PRB resource within the narrowband carried in the resource position indication information; or the position of the actually allocated resource is determined according to the position information of the PRB resource within the narrowband and the position information of the PRB resource out of the narrowband carried in the resource position indication information.

In one implementation, the actually allocated resource includes: a resource actually allocated to a physical uplink shared channel (PUSCH) or a resource actually allocated to a physical downlink shared channel (PDSCH).

In one implementation, the step in which the resource position indication information is sent includes:

in a coverage enhancement mode A:
in a case where the resource position indication information is a downlink control information (DCI) format 6-0A message, indicating a resource position of a resource actually allocated to a physical uplink shared channel (PUSCH) by using a remaining state of least significant 5 bits in a resource allocation field of the resource position indication information; and in a case where the resource position indication information is a downlink control information (DCI) format 6-1A message, indicating a resource position of a resource actually allocated to a physical downlink shared channel (PDSCH) by using the remaining state of least significant 5 bits in the resource allocation field of the resource position indication information.

A size of the resource allocation field of the DCI format 6-0A message or the DCI format 6-1A message is $$\left\lceil \log_2\left(\left\lceil \frac{N_{RB}^{UL}}{6} \right\rceil\right)\right\rceil + 5 \text{ or } \left\lceil \log_2\left(\left\lceil \frac{N_{RB}^{DL}}{6} \right\rceil\right)\right\rceil + 5,$$

some values of least significant 5 bit in the relevant art has been used for state indication. The present embodiment utilizes another part of unused values to indicate the position information of the PRB resource within the narrowband corresponding to the actually allocated resource and the shift offset information of the PRB resource within the narrowband.

In one implementation, the step in which the resource position indication information is sent includes: in a coverage enhancement mode B, indicating a resource position of an actually allocated resource by adding one or more information bits into a resource allocation field of the resource position indication information or extending a corresponding narrowband resource allocation field in the resource allocation field of the resource position indication information.

In one implementation, the step in which the resource position indication information is sent includes:

in a coverage enhancement mode B:
in a case where the resource position indication information is a downlink control information (DCI) format 6-0B message, indicating a resource position of a resource actually allocated to a physical uplink shared channel (PUSCH) by adding one or more information bits into the resource allocation field of the resource position indication information or extending the corresponding narrowband resource allocation field in the resource allocation field of the resource position indication information;

in a case where the resource position indication information is the downlink control information (DCI) format 6-1B message, indicating a resource position of a resource actually allocated to a physical downlink shared channel (PDSCH) by adding one or more information bits into the resource allocation field of the resource position indication information or extending the corresponding narrowband resource allocation field in the resource allocation field of the resource position indication information.

The resource allocation field is a message field in DCI, and the resource allocation field includes a narrowband indication field and a narrowband resource allocation field.

In one implementation, the shift offset information is determined by:
  a position of the PRB resource within the narrowband; or
  a system bandwidth and the position of the PRB resource within the narrowband; or
  a narrowband index, the system bandwidth and the position of the PRB resource within the narrowband; or
  the narrowband index and the position of the PRB resource within the narrowband.

In one implementation, the step in which the resource position indication information is sent includes:
  in a coverage enhancement mode A:
    in a case where the PRB resource within the narrowband is PRB0 and PRB1, the shift offset being shifting one PRB forward;
    in a case where the PRB resource within the narrowband is PRB4 and PRB5, the shift offset being shifting one PRB backward;
    in a case where the PRB resource within the narrowband is PRB0, PRB1 and PRB2, the shift offset being shifting one PRB forward;
    in a case where the PRB resource within the narrowband is PRB3, PRB4 and PRB5, the shift offset being shifting two PRBs backward;
    in a case where the PRB resource within the narrowband is PRB0, PRB1, PRB2 and PRB3, the shift offset being shifting one PRB forward or shifting two PRBs forward;
    in a case where the PRB resource within the narrowband is PRB2, PRB3, PRB4 and PRB5, the shift offset being shifting one PRB backward or shifting two PRBs backward; and
    in a case where the PRB resource within the narrowband is PRB0, PRB1, PRB2, PRB3, PRB4 and PRB5, the shift offset being any one of: shifting one PRB forward, shifting one PRB backward, or shifting two PRBs backward.

In one implementation, the step in which the resource position indication information is sent includes:
  in a coverage enhancement mode A:
    the PRB resource within the narrowband being PRB0, and the PRB resource out of the narrowband being PRB5 of a preceding narrowband;
    the PRB resource within the narrowband being PRB5, and the PRB resource out of the narrowband being PRB0 of a subsequent narrowband;
    the PRB resource within the narrowband being PRB0 and PRB1, and the PRB resource out of the narrowband being PRB5 of the preceding narrowband;
    the PRB resource within the narrowband being PRB5, and the PRB resource out of the narrowband being PRB0 and PRB1 of the subsequent narrowband;
    the PRB resource within the narrowband being PRB0, PRB1 and PRB2, and the PRB resource out of the narrowband being PRB5 of the preceding narrowband;
    the PRB resource within the narrowband being PRB0 and PRB1, and the PRB resource out of the narrowband being PRB4 and PRB5 of the preceding narrowband;
    the PRB resource within the narrowband being PRB3, PRB4 and PRB5, and the PRB resource out of the narrowband being PRB0 of the subsequent narrowband;
    the PRB resource within the narrowband being PRB4 and PRB5, and the PRB resource out of the narrowband being PRB0 and PRB1 of the subsequent narrowband;
    the PRB resource within the narrowband being PRB0, PRB1, PRB2, PRB3 and PRB4, and the PRB resource out of the narrowband being PRB5 of the preceding narrowband;
    the PRB resource within the narrowband being PRB1, PRB2, PRB3, PRB4 and PRB5, and the PRB resource out of the narrowband being PRB0 of the subsequent narrowband; or
    the PRB resource within the narrowband being PRB2, PRB3, PRB4 and PRB5, and the PRB resource out of the narrowband being PRB0 and PRB1 of the subsequent narrowband.

In one implementation, the step in which the resource position indication information is sent includes:
  in the coverage enhancement mode A, in a case where a system bandwidth is 3 MHz or 5 MHz and a narrowband index is 2 or 3:
    in a case where the PRB resource within the narrowband is PRB0 and PRB1, the shift offset being shifting one PRB forward;
    in a case where the PRB resource within the narrowband is PRB4 and PRB5, the shift offset being shifting one PRB backward;
    in a case where the PRB resource within the narrowband is PRB0, PRB1, PRB2 and PRB3, the shift offset being shifting one PRB forward;
    in a case where the PRB resource within the narrowband is PRB2, PRB3, PRB4 and PRB5, the shift offset being shifting one PRB backward; and
    in a case where the PRB resource within the narrowband is PRB0, PRB1, PRB2, PRB3, PRB4 and PRB5, the shift offset being shifting one PRB forward or shifting one PRB backward.

In one implementation, the step in which the resource position indication information is sent includes: in the coverage enhancement mode A, in a case where a system bandwidth is 10 MHz:
    in a case where the PRB resource within the narrowband is PRB0, PRB1 and PRB2, the shift offset being shifting one PRB forward;
    in a case where the PRB resource within the narrowband is PRB3, PRB4 and PRB5, the shift offset being shifting two PRBs backward; and
    in a case where the PRB resource within the narrowband is PRB0, PRB1, PRB2, PRB3, PRB4 and PRB5, the shift offset being shifting one PRB forward or shifting two PRBs backward.

In one implementation, the step in which the resource position indication information is sent includes:
  in the coverage enhancement mode A, in a case where a system bandwidth is 15 MHz:
    in a case where a narrowband index is 0, 2 or 4, and the PRB resource within the narrowband is PRB0, PRB1, PRB2 and PRB3, the shift offset being shifting one PRB forward;
    in a case where the narrowband index is 0, 2 or 4, and the PRB resource within the narrowband is PRB2, PRB3, PRB4 and PRB5, the shift offset being shifting one PRB backward;
    in a case where the narrowband index is 1, 3 or 5, and the PRB resource within the narrowband is PRB0, PRB1, PRB2 and PRB3, the shift offset being shifting one PRB backward;

in a case where the narrowband index is 1, 3 or 5, and the PRB resource within the narrowband is PRB2, PRB3, PRB4 and PRB5, the shift offset being shifting one PRB forward;

in a case where the narrowband index is 6, 8 or 10, and the PRB resource within the narrowband is PRB0, PRB1 and PRB2, the shift offset being shifting one PRB forward or shifting two PRBs forward;

in a case where the narrowband index is 6, 8 or 10, and the PRB resource within the narrowband is PRB0, PRB1, PRB2 and PRB3, the shift offset being shifting two PRBs forward;

in a case where the narrowband index is 7 or 9, and the PRB resource within the narrowband is PRB2, PRB3, PRB4 and PRB5, the shift offset being shifting two PRBs backward; and in a case where the narrowband index is 11, and the PRB resource within the narrowband is PRB3, PRB4 and PRB5, the shift offset being shifting one PRB backward.

In one implementation, the step in which the resource position indication information is sent includes:

in the coverage enhancement mode A, in a case where a system bandwidth is 20 MHz:

in a case where a narrowband index is even, and the PRB resource within the narrowband is PRB0, PRB1 and PRB2, the shift offset being shifting one PRB forward or shifting two PRBs forward;

in a case where the narrowband index is even, and the PRB resource within the narrowband is PRB0, PRB1, PRB2 and PRB3, the shift offset being shifting two PRBs forward;

in a case where the narrowband index is odd, and the PRB resource within the narrowband is PRB3, PRB4 and PRB5, the shift offset being shifting one PRB backward or shifting two PRBs backward; and in a case where the narrowband index is odd, and the PRB resource within the narrowband is PRB2, PRB3, PRB4 and PRB5, the shift offset being shifting two PRBs backward.

In one implementation, the step in which the resource position indication information is sent includes:

in a coverage enhancement mode B, in a case where an actually allocated resource is a resource actually allocated to a physical uplink shared channel (PUSCH), and a system bandwidth is 3 MHz or 5 MHz:

in a case where the PRB resource within the narrowband is PRB0, the shift offset being shifting one PRB forward;

in a case where the PRB resource within the narrowband is PRB5, the shift offset being shifting one PRB backward;

in a case where the PRB resource within the narrowband is PRB0 and PRB1, the shift offset being shifting one PRB forward or shifting one PRB backward; and in a case where the PRB resource within the narrowband is PRB2 and PRB3, the shift offset being shifting one PRB forward or shifting one PRB backward.

In one implementation, the step in which the resource position indication information is sent includes:

in a coverage enhancement mode B, in a case where an actually allocated resource is a resource actually allocated to a physical uplink shared channel (PUSCH), and a system bandwidth is 10 MHz:

in a case where the PRB resource within the narrowband is PRB0, the shift offset being shifting one PRB forward; and in a case where the PRB resource within the narrowband is PRB5, the shift offset being shifting one PRB backward or shifting two PRBs backward.

In one implementation, the step in which the resource position indication information is sent includes:

in the coverage enhancement mode B, in a case where an actually allocated resource is a resource actually allocated to a physical uplink shared channel (PUSCH), and a system bandwidth is 15 MHz:

in a case where the PRB resource within the narrowband is PRB0, the shift offset being shifting one PRB forward;

in a case where the PRB resource within the narrowband is PRB5, the shift offset being shifting one PRB backward; and in a case where the PRB resource within the narrowband is PRB2 and PRB3, the shift offset being shifting one PRB forward or shifting one PRB backward.

In one implementation, the step in which the resource position indication information is sent includes:

in the coverage enhancement mode B, in a case where an actually allocated resource is a resource actually allocated to a physical uplink shared channel (PUSCH), and a system bandwidth is 20 MHz:

in a case where the PRB resource within the narrowband is PRB0, the shift offset being shifting one PRB forward or shifting two PRBs forward;

in a case where the PRB resource within the narrowband is PRB5, the shift offset being shifting one PRB backward or shifting two PRBs backward; and in a case where the PRB resource within the narrowband is PRB0 and PRB1, the shift offset being shifting two PRBs forward.

In one implementation, the step in which the resource position indication information is sent includes: in the coverage enhancement mode B, in a case where an actually allocated resource is a resource actually allocated to a physical downlink shared channel (PDSCH), and a system bandwidth is 3 MHz or 5 MHz: in a case where the PRB resource within the narrowband is PRB0, PRB1, PRB2 and PRB3, the shift offset being shifting one PRB forward; and in a case where the PRB resource within the narrowband is PRB0, PRB1, PRB2, PRB3, PRB4 and PRB5, the shift offset being shifting one PRB forward or shifting one PRB backward.

In one implementation, the step in which the resource position indication information is sent includes: in the coverage enhancement mode B, in a case where an actually allocated resource is a resource actually allocated to a physical downlink shared channel (PDSCH), and a system bandwidth is 10 MHz: in a case where the PRB resource within the narrowband is PRB0, PRB1, PRB2, PRB3, PRB4 and PRB5, the shift offset being shifting one PRB backward or shifting two PRBs backward.

In one implementation, the step in which the resource position indication information is sent includes: in the coverage enhancement mode B, in a case where an actually allocated resource is a resource actually allocated to a physical downlink shared channel (PDSCH), and a narrowband index is 15 MHz: in a case where the PRB resource within the narrowband is PRB0, PRB1, PRB2 and PRB3, the shift offset being shifting one PRB forward.

In one implementation, the step in which the resource position indication information is sent includes: in a coverage enhancement mode B, in a case where an actually allocated resource is a resource actually allocated to a physical downlink shared channel (PDSCH), and a system bandwidth is 20 MHz: in a case where the PRB resource within the narrowband is PRB0, PRB1, PRB2 and PRB3, the shift offset being shifting two PRBs forward.

Compared with the related technology, the present disclosure provides a resource allocation method and an device sending the resource position indication information, where the resource position indication information carries position information of the physical resource block (PRB) resource within the narrowband and shift offset information of the PRB resource within the narrowband, or the resource position indication information carries position information of the PRB resource within the narrowband and position information of a PRB resource out of the narrowband. The disclosed method and device can implement a more flexible narrowband resource allocation strategy, thereby improving the resource allocation flexibility for narrowband user equipments.

Embodiment 2

Figure 3:
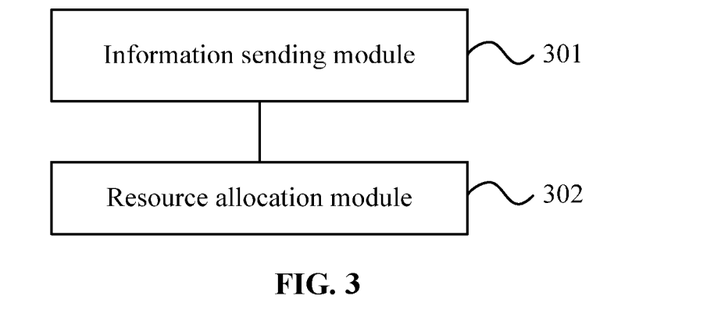
FIG. 3 is a structural diagram of a resource allocation device according to embodiment two of the present disclosure.

As shown in FIG. 3, an embodiment of the present disclosure provides a resource allocation device, including: an information sending module 301 and a resource allocation module 302.

The information sending module 301 is configured to send resource position indication information, wherein the resource position indication information carries position information of a physical resource block (PRB) resource within a narrowband and shift offset information of the PRB resource within the narrowband, or the resource position indication information carries position information of the PRB resource within the narrowband and position information of a PRB resource out of the narrowband.

The resource allocation module 302 is configured to determine a position of an actually allocated resource according to the position information of the PRB resource within the narrowband carried in the resource position indication information and the shift offset information of the PRB resource within the narrowband carried in the resource position indication information; or determine a position of an actually allocated resource according to position information of the PRB resource within the narrowband and the position information of the PRB resource out of the narrowband carried in the resource position indication information.

In one implementation, the actually allocated resource includes: a resource actually allocated to a physical uplink shared channel (PUSCH) or a resource actually allocated to a physical downlink shared channel (PDSCH).

In one implementation, the information sending module is configured to send resource position indication information in the following manner:
in the coverage enhancement mode A:
in a case where the resource position indication information is a downlink control information (DCI) format 6-0A message, indicating a resource position of a resource actually allocated to a physical uplink shared channel (PUSCH) by using a remaining state of least significant 5 bits in a resource allocation field of the resource position indication information; and
in a case where the resource position indication information is a downlink control information (DCI) format 6-1A message, indicating a resource position of a resource actually allocated to a physical downlink shared channel (PDSCH) by using the remaining state of least significant 5 bits in the resource allocation field of the resource position indication information.

A size of the resource allocation field of the DCI format 6-0A message or the DCI format 6-1A message is $$\left\lceil \log_2\left(\left\lfloor \frac{N_{RB}^{UL}}{6} \right\rfloor\right) \right\rceil + 5 \text{ or } \left\lceil \log_2\left(\left\lfloor \frac{N_{RB}^{DL}}{6} \right\rfloor\right) \right\rceil + 5,$$

some values of least significant 5 bit in the relevant art has been used for state indication. This embodiment utilizes another part of unused values to indicate the position information of the PRB resource within the narrowband corresponding to the actually allocated resource and the shift offset information of the PRB resource within the narrowband.

In one implementation, the information sending module is configured to send resource position indication information in the following manner:
in a coverage enhancement mode B: indicating a resource position of an actually allocated resource by adding at least one information bit into a resource allocation field of the resource position indication information or extending a corresponding narrowband resource allocation field in the resource allocation field of the resource position indication information.

In one implementation, the information sending module is configured to send resource position indication information in the following manner:
in the coverage enhancement mode B:
in a case where the resource position indication information is a downlink control information (DCI) format 6-0B message, indicating a resource position of a resource actually allocated to a physical uplink shared channel (PUSCH) by adding one or more information bits into the resource allocation field of the resource position indication information or extending the corresponding narrowband resource allocation field in the resource allocation field of the resource position indication information;
in a case where the resource position indication information is the downlink control information (DCI) format 6-1B message, indicating a resource position of a resource actually allocated to a physical downlink shared channel (PDSCH) by adding one or more information bits into the resource allocation field of the resource position indication information or extending the corresponding narrowband resource allocation field in the resource allocation field of the resource position indication information.

The resource allocation field is a message field in DCI, and the resource allocation field includes a narrowband indication field and a narrowband resource allocation field.

In one implementation, the shift offset information is determined by:
a position of the PRB resource within the narrowband; or
a system bandwidth and the position of the PRB resource within the narrowband; or
a narrowband index, the system bandwidth and the position of the PRB resource within the narrowband; or
the narrowband index and the position of the PRB resource within the narrowband.

In one implementation, the information sending module is configured to send resource position indication information in the following manner:

in the coverage enhancement mode A:
in a case where the PRB resource within the narrowband is PRB0 and PRB1, the shift offset being shifting one PRB forward;
in a case where the PRB resource within the narrowband is PRB4 and PRB5, the shift offset being shifting one PRB backward;
in a case where the PRB resource within the narrowband is PRB0, PRB1 and PRB2, the shift offset being shifting one PRB forward;
in a case where the PRB resource within the narrowband is PRB3, PRB4 and PRB5, the shift offset being shifting two PRBs backward;
in a case where the PRB resource within the narrowband is PRB0, PRB1, PRB2 and PRB3, the shift offset being shifting one PRB forward or shifting two PRBs forward;
in a case where the PRB resource within the narrowband is PRB2, PRB3, PRB4 and PRB5, the shift offset being shifting one PRB backward or shifting two PRBs backward; and
in a case where the PRB resource within the narrowband is PRB0, PRB1, PRB2, PRB3, PRB4 and PRB5, the shift offset being any one of: shifting one PRB forward, shifting one PRB backward, or shifting two PRBs backward.

In one implementation, the information sending module is configured to send resource position indication information in the following manner:

in the coverage enhancement mode A:
the PRB resource within the narrowband being PRB0, and the PRB resource out of the narrowband being PRB5 of a preceding narrowband;
the PRB resource within the narrowband being PRB5, and the PRB resource out of the narrowband being PRB0 of a subsequent narrowband;
the PRB resource within the narrowband being PRB0 and PRB1, and the PRB resource out of the narrowband being PRB5 of the preceding narrowband;
the PRB resource within the narrowband being PRB5, and the PRB resource out of the narrowband being PRB0 and PRB1 of the subsequent narrowband;
the PRB resource within the narrowband being PRB0, PRB1 and PRB2, and the PRB resource out of the narrowband being PRB5 of the preceding narrowband;
the PRB resource within the narrowband being PRB0 and PRB1, and the PRB resource out of the narrowband being PRB4 and PRB5 of the preceding narrowband;
the PRB resource within the narrowband being PRB3, PRB4 and PRB5, and the PRB resource out of the narrowband being PRB0 of the subsequent narrowband;
the PRB resource within the narrowband being PRB4 and PRB5, and the PRB resource out of the narrowband being PRB0 and PRB1 of the subsequent narrowband;
the PRB resource within the narrowband being PRB0, PRB1, PRB2, PRB3 and PRB4, and the PRB resource out of the narrowband being PRB5 of the preceding narrowband;
the PRB resource within the narrowband being PRB1, PRB2, PRB3, PRB4 and PRB5, and the PRB resource out of the narrowband being PRB0 of the subsequent narrowband; or
the PRB resource within the narrowband being PRB2, PRB3, PRB4 and PRB5, and the PRB resource out of the narrowband being PRB0 and PRB1 of the subsequent narrowband.

In one implementation, the information sending module is configured to send resource position indication information in the following manner:

in the coverage enhancement mode A, in a case where a system bandwidth is 3 MHz or 5 MHz and a narrowband index is 2 or 3:
in a case where the PRB resource within the narrowband is PRB0 and PRB1, the shift offset being shifting one PRB forward;
in a case where the PRB resource within the narrowband is PRB4 and PRB5, the shift offset being shifting one PRB backward;
in a case where the PRB resource within the narrowband is PRB0, PRB1, PRB2 and PRB3, the shift offset being shifting one PRB forward;
in a case where the PRB resource within the narrowband is PRB2, PRB3, PRB4 and PRB5, the shift offset being shifting one PRB backward; and
in a case where the PRB resource within the narrowband is PRB0, PRB1, PRB2, PRB3, PRB4 and PRB5, the shift offset being shifting one PRB forward or shifting one PRB backward.

In one implementation, the information sending module is configured to send resource position indication information in the following manner:

in the coverage enhancement mode A, in a case where a system bandwidth is 10 MHz:
in a case where the PRB resource within the narrowband is PRB0, PRB1 and PRB2, the shift offset being shifting one PRB forward;
in a case where the PRB resource within the narrowband is PRB3, PRB4 and PRB5, the shift offset being shifting two PRBs backward; and
in a case where the PRB resource within the narrowband is PRB0, PRB1, PRB2, PRB3, PRB4 and PRB5, the shift offset being shifting one PRB forward or shifting two PRBs backward.

In one implementation, the information sending module is configured to send resource position indication information in the following manner:

in the coverage enhancement mode A, in a case where a system bandwidth is 15 MHz:
in a case where a narrowband index is 0, 2 or 4, and the PRB resource within the narrowband is PRB0, PRB1, PRB2 and PRB3, the shift offset being shifting one PRB forward;
in a case where the narrowband index is 0, 2 or 4, and the PRB resource within the narrowband is PRB2, PRB3, PRB4 and PRB5, the shift offset being shifting one PRB backward;
in a case where the narrowband index is 1, 3 or 5, and the PRB resource within the narrowband is PRB0, PRB1, PRB2 and PRB3, the shift offset being shifting one PRB backward;
in a case where the narrowband index is 1, 3 or 5, and the PRB resource within the narrowband is PRB2, PRB3, PRB4 and PRB5, the shift offset being shifting one PRB forward;
in a case where the narrowband index is 6, 8 or 10, and the PRB resource within the narrowband is PRB0, PRB1 and PRB2, the shift offset being shifting one PRB forward or shifting two PRBs forward;

in a case where the narrowband index is 6, 8 or 10, and the PRB resource within the narrowband is PRB0, PRB1, PRB2 and PRB3, the shift offset being shifting two PRBs forward;

in a case where the narrowband index is 7 or 9, and the PRB resource within the narrowband is PRB2, PRB3, PRB4 and PRB5, the shift offset being shifting two PRBs backward; and in a case where the narrowband index is 11, and the PRB resource within the narrowband is PRB3, PRB4 and PRB5, the shift offset being shifting one PRB backward.

In one implementation, the information sending module is configured to send resource position indication information in the following manner:

in the coverage enhancement mode A, in a case where a system bandwidth is 20 MHz:

in a case where a narrowband index is even, and the PRB resource within the narrowband is PRB0, PRB1 and PRB2, the shift offset being shifting one PRB forward or shifting two PRBs forward;

in a case where the narrowband index is even, and the PRB resource within the narrowband is PRB0, PRB1, PRB2 and PRB3, the shift offset being shifting two PRBs forward;

in a case where the narrowband index is odd, and the PRB resource within the narrowband is PRB3, PRB4 and PRB5, the shift offset being shifting one PRB backward or shifting two PRBs backward; and in a case where the narrowband index is odd, and the PRB resource within the narrowband is PRB2, PRB3, PRB4 and PRB5, the shift offset being shifting two PRBs backward.

In one implementation, the information sending module is configured to send resource position indication information in the following manner:

in a coverage enhancement mode B, in a case where an actually allocated resource is a resource actually allocated to a physical uplink shared channel (PUSCH), and a system bandwidth is 3 MHz or 5 MHz:

in a case where the PRB resource within the narrowband is PRB0, the shift offset being shifting one PRB forward;

in a case where the PRB resource within the narrowband is PRB5, the shift offset being shifting one PRB backward;

in a case where the PRB resource within the narrowband is PRB0 and PRB1, the shift offset being shifting one PRB forward or shifting one PRB backward; and in a case where the PRB resource within the narrowband is PRB2 and PRB3, the shift offset being shifting one PRB forward or shifting one PRB backward.

In one implementation, the information sending module is configured to send resource position indication information in the following manner:

in the coverage enhancement mode B, in a case where an actually allocated resource is a resource actually allocated to a physical uplink shared channel (PUSCH), and a system bandwidth is 10 MHz:

in a case where the PRB resource within the narrowband is PRB0, the shift offset being shifting one PRB forward; and in a case where the PRB resource within the narrowband is PRB5, the shift offset being shifting one PRB backward or shifting two PRBs backward.

In one implementation, the information sending module is configured to send resource position indication information in the following manner:

in the coverage enhancement mode B, in a case where an actually allocated resource is a resource actually allocated to a physical uplink shared channel (PUSCH), and a system bandwidth is 15 MHz:

in a case where the PRB resource within the narrowband is PRB0, the shift offset being shifting one PRB forward;

in a case where the PRB resource within the narrowband is PRB5, the shift offset being shifting one PRB backward; and in a case where the PRB resource within the narrowband is PRB2 and PRB3, the shift offset being shifting one PRB forward or shifting one PRB backward.

In one implementation, the information sending module is configured to send resource position indication information in the following manner:

in the coverage enhancement mode B, in a case where an actually allocated resource is a resource actually allocated to a physical uplink shared channel (PUSCH), and a system bandwidth is 20 MHz:

in a case where the PRB resource within the narrowband is PRB0, the shift offset being shifting one PRB forward or shifting two PRBs forward;

in a case where the PRB resource within the narrowband is PRB5, the shift offset being shifting one PRB backward or shifting two PRBs backward; and in a case where the PRB resource within the narrowband is PRB0 and PRB1, the shift offset being shifting two PRBs forward.

In one implementation, the information sending module is configured to send resource position indication information in the following manner:

in the coverage enhancement mode B, in a case where an actually allocated resource is a resource actually allocated to a physical downlink shared channel (PDSCH), and a system bandwidth is 3 MHz or 5 MHz:

in a case where the PRB resource within the narrowband is PRB0, PRB1, PRB2 and PRB3, the shift offset being shifting one PRB forward; and in a case where the PRB resource within the narrowband is PRB0, PRB1, PRB2, PRB3, PRB4 and PRB5, the shift offset being shifting one PRB forward or shifting one PRB backward.

In one implementation, the information sending module is configured to send resource position indication information in the following manner: in the coverage enhancement mode B, in a case where an actually allocated resource is a resource actually allocated to a physical downlink shared channel (PDSCH), and a system bandwidth is 10 MHz: in a case where the PRB resource within the narrowband is PRB0, PRB1, PRB2, PRB3, PRB4 and PRB5, the shift offset being shifting one PRB backward or shifting two PRBs backward.

In one implementation, the information sending module is configured to send resource position indication information in the following manner: in the coverage enhancement mode B, in a case where an actually allocated resource is a resource actually allocated to a physical downlink shared channel (PDSCH), and a system bandwidth number is 15

MHz: in a case where the PRB resource within the narrowband is PRB0, PRB1, PRB2 and PRB3, the shift offset being shifting one PRB forward.

In one implementation, the information sending module is configured to send resource position indication information in the following manner: in the coverage enhancement mode B, in a case where an actually allocated resource is a resource actually allocated to a physical downlink shared channel (PDSCH), and a system bandwidth is 20 MHz: in a case where the PRB resource within the narrowband is PRB0, PRB1, PRB2 and PRB3, the shift offset being shifting two PRBs forward.

Embodiment 3

An embodiment of the present disclosure provides a resource allocation device, including: a memory, a processor, and a resource allocation program stored in the memory and executable by the processor, where the resource allocation program, when executed by the processor, implements the resource allocation method in the embodiment 1.

Embodiment 4

An embodiment of the present disclosure provides a computer-readable storage medium storing a resource allocation program which, when executed by a processor, implements the resource allocation method according to the embodiment 1.

The resource allocation method of the present disclosure is further described below by way of examples.

Example 1

This example provides a resource allocation method for flexible resource allocation of narrowband PDSCH/PUSCH in a scenario of a coverage enhancement mode A.

In the coverage enhancement mode A: a PRB resource within a narrowband corresponding to an actually allocated resource and a shift offset information of the PRB resource within the narrowband are indicated by a remaining state of resource allocation within the narrowband of least significant 5 bits in a resource allocation field in DCI format 6-0A/6-1A. A PDSCH resource position actually allocated is determined according to the PRB resource within the narrowband and the shift offset information.

The least significant 5 bits in the resource allocation field in the DCI format 6-0A/6-1A may indicate the resource allocation state of 32 narrowbands, where 21 narrowbands among the 32 narrowbands have been used.

Therefore, as shown in Table 1 below, the state of the remaining 11 narrowbands is used in this example to indicate partial PRB positions within the narrowband and the corresponding shift offset information respectively. The PDSCH/PUSCH resource position actually allocated is determined according to the indicated PRB resource within the narrowband and the shift offset information.

TABLE 1

| 5-bit resource indication (remaining state value) | PRB within a narrowband | Shift offset |
| --- | --- | --- |
| 21 | PRB0 and PRB1 (PRB0 corresponding to the first PRB within the narrowband) | Shifting one PRB forward |

TABLE 1-continued

| 5-bit resource indication (remaining state value) | PRB within a narrowband | Shift offset |
| --- | --- | --- |
| 22 | PRB4 and PRB5 | Shifting one PRB backward |
| 23 | PRB0, PRB1 and PRB2 | Shifting one PRB forward |
| 24 | PRB3, PRB4 and PRB5 | Shifting two PRBs backward |
| 25 | PRB0, PRB1, PRB2 and PRB3 | Shifting one PRB forward |
| 26 | | Shifting two PRBs forward |
| 27 | PRB2, PRB3, PRB4 and PRB5 | Shifting one PRB backward |
| 28 | | Shifting two PRBs backward |
| 29 | PRB0, PRB1, PRB2, PRB3, | Shifting one PRB forward |
| 30 | PRB4 and PRB5 | Shifting one PRB backward |
| 31 | | Shifting two PRBs backward |

A corresponding relationship between the resource indication (the remaining state value corresponding to the 5-bit information bits and the shift offset as well as the PRB position within the narrowband in Table 1 is merely an example, and other corresponding relationships are not listed one by one, which are also within the protection scope of this application.

Figure 4A:
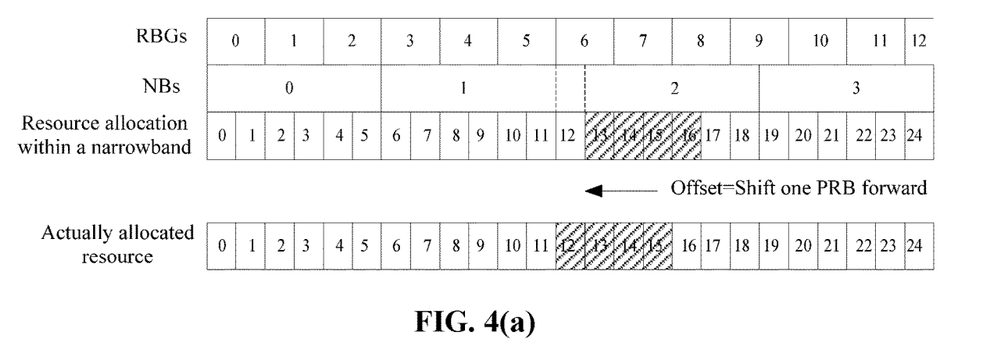
Figure 4B:
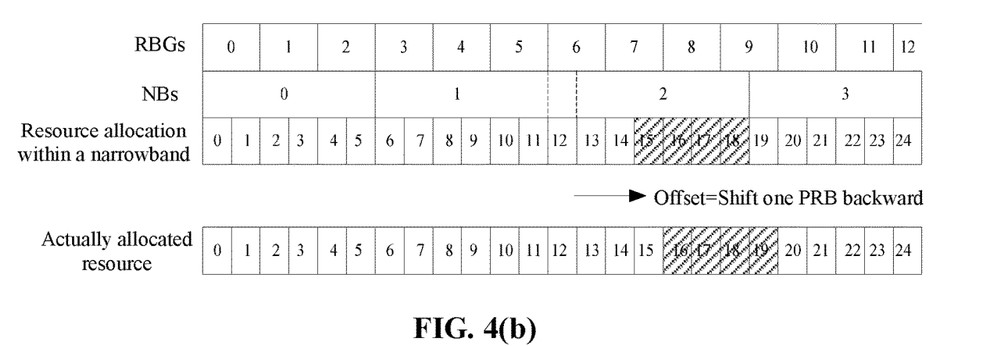

With reference to Table 1, the resource allocation method of this example is described with two remaining state values (25 and 27). As shown in FIG. 4(a), the value of the least significant 5 bits in the resource allocation field in the DCI format 6-0A/6-1A is 25, and the actually allocated PDSCH/PUSCH resources are determined according to the indicated PRB within the narrowband (PRB0, PRB1, PRB2 and PRB3 corresponding to narrowband index 2 (i.e., PRB13, PRB14, PRB15 and PRB16) and the shift offset (shifting one PRB forward). Therefore, the determined actually allocated PDSCH/PUSCH resources are PRB12, PRB13, PRB14 and PRB15. As shown in FIG. 4(b), the value of the least significant 5 bits in the resource allocation field in the DCI format 6-0A/6-1A is 27, and the actually allocated PDSCH/PUSCH resources are determined according to the indicated PRB within the narrowband (PRB2, PRB3, PRB4 and PRB5 corresponding to narrowband index 2 (i.e., PRB15, PRB16, PRB17 and PRB18) and the shift offset (shifting one PRB backward). Therefore, the determined actually allocated PDSCH/PUSCH resources are PRB16, PRB17, PRB18 and PRB19.

The method described in this example may provide a more flexible resource allocation mode for narrowband PDSCH/PUSCH in the coverage enhancement mode A.

Example 2

This example provides a resource allocation method for flexible resource allocation of narrowband PDSCH/PUSCH in a scenario of a coverage enhancement mode A.

In the coverage enhancement mode A: position information of a PRB resource within the narrowband and position information of a PRB resource out of the narrowband corresponding to the actually allocated resource is indicated by a remaining state of resource allocation within the narrowband of least significant 5 bits in the resource allocation field in DCI format 6-0A/6-1A, and PDSCH/PUSCH resource positions actually allocated are determined jointly according to the PRB resource out of the narrowband and the PRB resource within the narrowband.

The least significant 5 bits in the resource allocation field in the DCI format 6-0A/6-1A may indicate resource allocation states of 32 narrowbands, where 21 narrowbands among the 32 narrowbands have been used.

Therefore, as shown in Table 2-1 below, the remaining 11 states are used to indicate positions of partial PRBs allocated within the narrow band and the position of PRB resource out of the narrowband respectively in this example. The PDSCH/PUSCH resource position actually allocated is determined according to the indicated PRB resource within the narrowband and the PRB resource out of the narrowband.

TABLE 2-1

| 5-bit resource indication (remaining state value) | PRB within a narrowband | PRB out of the narrowband |
|---|---|---|
| 21 | PRB0 | PRB0 PRB5 of a preceding narrowband |
| 22 | PRB5 | PRB0 of a subsequent narrowband |
| 23 | PRB0 and PRB1 | PRB5 of a preceding narrowband |
| 24 | PRB5 | PRB0 and PRB1 of a subsequent narrowband |
| 25 | PRB0, PRB1 and PRB2 | PRB5 of a preceding narrowband |
| 26 | PRB0 and PRB1 | PRB4 and PRB5 of a preceding narrowband |
| 27 | PRB3, PRB4 and PRB5 | PRB0 of a subsequent narrowband |
| 28 | PRB4 and PRB5 | PRB0 and PRB1 of a subsequent narrowband |
| 29 | PRB0, PRB1, PRB2, PRB3 and PRB4 | PRB5 of a preceding narrowband |
| 30 | PRB1, PRB2, PRB3, PRB4 and PRB5 | PRB0 of a subsequent narrowband |
| 31 | PRB2, PRB3, PRB4 and PRB5 | PRB0 and PRB1 of a subsequent narrowband |

TABLE 2-2

| 5-bit resource indication (remaining state value) | Allocated PRB position |
|---|---|
| 21 | PRB-1 and PRB0 |
| 22 | PRB5 and PRB6 |
| 23 | PRB-1, PRB0 and PRB1 |
| 24 | PRB5, PRB6 and PRB7 |
| 25 | PRB-1, PRB0, PRB1 and PRB2 |
| 26 | PRB-2, PRB-1, PRB0 and PRB1 |
| 27 | PRB3, PRB4, PRB5 and PRB6 |
| 28 | PRB4, PRB5, PRB6 and PRB7 |
| 29 | PRB-1, PRB0, PRB1, PRB2, PRB3 and PRB4 |
| 30 | PRB1, PRB2, PRB3, PRB4, PRB5 and PRB6 |
| 31 | PRB2, PRB3, PRB4, PRB5, PRB6 and PRB7 |

A corresponding relationship between the resource indication (the remaining state value corresponding to the 5 bits for information) and the PRB position out of the narrowband as well as the PRB position within the narrowband in Table 2-1 is merely an example, other corresponding relationships are not listed one by one, which are also within the protection scope of this disclosure.

With reference to Table 2-1, the resource allocation method of this example is explained with two remaining state values (25 and 27). As shown in FIG. 4(a), the value of the least significant 5 bits in the resource allocation field in the DCI format 6-0A/6-1A is 25, and the actually allocated PDSCH/PUSCH resources are determined according to the indicated PRB within the narrowband (PRB0, PRB1 and PRB2 corresponding to narrowband index 2 (i.e., PRB13, PRB14 and PRB15) and the PRB out of the narrowband (PRB5 in a narrowband index 1, i.e., PRB 12). Therefore, the determined actually allocated PDSCH/PUSCH resources are PRB12, PRB13, PRB14 and PRB15. As shown in FIG. 4(b), the value of the least significant 5 bits in the resource allocation field in the DCI format 6-0A/6-1A is 27, and the actually allocated PDSCH/PUSCH resources are determined according to the indicated PRB within the narrowband (PRB3, PRB4 and PRB5 corresponding to narrowband index 2 (i.e., PRB16, PRB17 and PRB18) and the PRB out of the narrowband (PRB0 corresponding to narrowband index 3, i.e., PRB 19). Therefore, the determined actually allocated PDSCH/PUSCH resources are PRB16, PRB17, PRB18 and PRB19.

As shown in Table 2-2, the state of the remaining 11 narrowbands is used in this example to indicate the PRB position of the actually allocated resource respectively. The PRB position of the actually allocated resource includes a position of the PRB resource within the narrowband and a position of the PRB resource out of the narrowband, where the position of the PRB resource out of the narrowband is represented in the following manners: representing a position of the PRB resource of a preceding narrowband relative to a current narrowband by using a negative number and representing a position of the PRB resource of a subsequent narrowband relative to a current narrowband by using an integer greater than 5. As an example, as described with reference to Table 2-1, a narrowband with a narrowband index 2 corresponds to the current narrowband, a narrowband with a narrowband index 1 corresponds to the preceding narrowband relative to the current narrowband, and a narrowband with a narrowband index 3 corresponds to the subsequent narrowband relative to the current narrowband. The position of the actually allocated PDSCH/PUSCH resource is determined according to the position of the indicated allocated PRB.

A corresponding relationship between the resource indication (the remaining state value of the 5 bits for information) and the position of the allocated PRB as shown in Table 2-2 is merely an example, and other corresponding relationships are not listed one by one, which are also within the protection scope of this application. The PRB position with a negative number in the table represents a PRB within a preceding narrowband corresponding to a current narrowband. The PRB position with a number greater than 5 represents a PRB within a subsequent narrowband corresponding to the current narrowband.

With reference to Table 2-2, the resource allocation method of this example is described with two remaining state values (25 and 27). As shown in 4(a), the value of the least significant 5 bits in the resource allocation field in the DCI format 6-0A/6-1A is 25, and the corresponding allocated PRB resources are PRB-1, PRB0, PRB1 and PRB2. In a case where the narrowband index is 2 (referring to the current narrowband), the actually allocated DSCH/PUSCH resource is determined according to the indicated allocated PRB position. The allocated PRB position corresponding to PRB-1 represents PRB5 within the narrowband with index 1; the allocated PRB positions PRB0, PRB1 and PRB2 represent PRB0, PRB1 and PRB2 within the narrowband with index 2, and thereby, the actually allocated resources are PRB12, PRB13, PRB14 and PRB15. As shown in FIG. 4(b), the value of the least significant 5 bits in the resource allocation field in the DCI format 6-0A/6-1A is 27, and the corresponding allocated PRB are PRB3, PRB4, PRB5 and PRB6. In a case where the narrowband index is 2, the actually allocated DSCH/PUSCH resource is determined according to the indicated allocated PRB position. The allocated PRB position corresponding to PRB3, PRB4 and PRB5 represent PRB3, PRB4 and PRB5 within the narrowband with index 2; the allocated PRB position corresponding to PRB6 represents PRB0 within the narrowband with index 3, and thereby, the actually allocated resources are PRB16, PRB17, PRB18 and PRB19.

Example 3

This example provides a resource allocation method for flexible resource allocation of narrowband PUSCH in a scenario of coverage enhancement mode B.

In the coverage enhancement mode B, 3-bit information bits for indicating a resource allocation state within the narrowband in a resource allocation field in DCI format 6-0B are extended into 4 bits, thereby flexibility in indicating narrowband PUSCH resource allocation state is achieved. As shown in Table 3 below:

TABLE 3

| 4-bit resource indication | PRB within a narrowband and shift offset |
|---|---|
| 0 | PRB0 (PRB0 corresponds to the first PRB within a narrowband), and the shift offset is 0 |
| 1 | PRB1, the shift offset is 0 |
| 2 | PRB2, the shift offset is 0 |
| 3 | PRB3, the shift offset is 0 |
| 4 | PRB4, the shift offset is 0 |
| 5 | PRB5, the shift offset is 0 |
| 6 | PRB0 and PRB1, the shift offset is 0 |
| 7 | PRB2 and PRB3, the shift offset is 0 |
| 8 | PRB0, the shift offset is shifting one PRB forward |
| 9 | PRB0, the shift offset is shifting two PRBs forward |
| 10 | PRB5, the shift offset is shifting one PRB backward |
| 11 | PRB5, the shift offset is shifting two PRBs backward |
| 12 | PRB0 and PRB1, the shift offset is shifting two PRBs forward |
| 13 | PRB2 and PRB3, the shift offset is shifting one PRB forward |
| 14 | PRB2 and PRB3, the shift offset is shifting one PRB backward |
| 15 | Reserving or introducing a new PRB position and shift offset |

A corresponding relationship between the resource indication (4-bit information bits) and the shift offset information as well as the PRB position within the narrowband in Table 3 is merely an example, other corresponding relationships are not listed one by one, which are also within the protection scope of this application.

The method described in this example may provide a more flexible resource allocation mode for narrowband PUSCH in the coverage enhancement mode B.

Example 4

This example provides a resource allocation method for flexible resource allocation of narrowband PUSCH in a coverage enhancement mode B scenario.

In the coverage enhancement mode B, 3-bit information bits for indicating a resource allocation state within the narrowband in a resource allocation field in DCI format 6-0B are extended into 4 bits, thereby flexibility in indicating narrowband PUSCH resource allocation state is achieved. As shown in Table 4 below:

TABLE 4

| 4-bit resource indication | PRB position |
|---|---|
| 0 | PRB0 (PRB0 corresponds to the first PRB within a narrowband) |
| 1 | PRB1, |
| 2 | PRB2, |
| 3 | PRB3, |
| 4 | PRB4, |
| 5 | PRB5, |
| 6 | PRB0 and PRB1, |
| 7 | PRB2 and PRB3, |
| 8 | PRB-1 and PRB0, |
| 9 | PRB-2 and PRB-1, |
| 10 | PRB6, |
| 11 | PRB7, |
| 12 | PRB-2 and PRB-1, |
| 13 | PRB1 and PRB2, |
| 14 | PRB3 and PRB4, |
| 15 | Reserving or introducing a new PRB position and shift offset |

A corresponding relationship between the resource indication (4-bit information bits) and the PRB position in Table 4 is merely an example, other corresponding relationships are not listed one by one, which are also within the protection scope of this application. A PRB position in the table with a negative number represents a PRB within a preceding narrowband relative to a current narrowband. The PRB position with a number greater than 5 represents a PRB within a subsequent narrowband relative to the current narrowband.

The method described in this example may provide a more flexible resource allocation mode for narrowband PDSCH in the coverage enhancement mode B.

Example 5

This example provides a resource allocation method for flexible resource allocation of narrowband PDSCH in a coverage enhancement mode B scenario.

In the coverage enhancement mode B, 1 information bit for indicating a resource allocation state within the narrowband in a resource allocation field in DCI format 6-1B is extended into 3 bits, thereby flexibility in indicating narrowband PDSCH resource allocation state is achieved. As shown in Table 5 below:

TABLE 5

| 3-bit resource indication | PRB within a narrowband and shift offset |
|---|---|
| 0 | PRB0, PRB1, PRB2 and PRB3 (PRB0 corresponds to the first PRB within a narrowband), the shift offset is 0 |
| 1 | PRB0, PRB1, PRB2, PRB3, PRB4 and PRB5, the shift offset is 0 |
| 2 | PRB0, PRB1, PRB2 and PRB3, the shift offset is shifting one PRB forward |
| 3 | PRB0, PRB1, PRB2 and PRB3, and the shift offset is a position shifting two PRBs forward |
| 4 | PRB0, PRB1, PRB2, PRB3, PRB4 and PRB5, and the shift offset is a position shifting one PRB forward |

TABLE 5-continued

| 3-bit resource indication | PRB within a narrowband and shift offset |
|---|---|
| 5 | PRB0, PRB1, PRB2, PRB3, PRB4 and PRB5, and the shift offset is a position shifting one PRB backward |
| 6 | PRB0, PRB1, PRB2, PRB3, PRB4 and PRB5, and the shift offset is a position shifting two PRBs backward |
| 7 | Reserving or introducing a new PRB position and shift offset |

A corresponding relationship between the resource indication (3-bit information bits) and the shift offset information as well as the PRB position within the narrowband in Table 5 is merely an example, other corresponding relationships are not listed one by one, which are also within the protection scope of this application.

The method described in this example may provide a more flexible resource allocation mode for narrowband PDSCH in the coverage enhancement mode B.

Example 6

This example provides a resource allocation method for flexible resource allocation of narrowband PDSCH in a coverage enhancement mode B scenario.

In the coverage enhancement mode B, 1 information bit for indicating a resource allocation state within the narrowband in a resource allocation field in DCI format 6-1B is extended into 3 bits, thereby flexibility in indicating narrowband PDSCH resource allocation state is achieved. As shown in Table 6 below:

TABLE 6

| 3-bit resource indication | PRB |
|---|---|
| 0 | PRB0, PRB1, PRB2 and PRB3 (PRB0 corresponds to a first PRB within a narrowband) |
| 1 | PRB0, PRB1, PRB2, PRB3, PRB4 and PRB5 |
| 2 | PRB-1, PRB0, PRB1 and PRB2 |
| 3 | PRB-2, PRB-1, PRB0 and PRB1 |
| 4 | PRB-1, PRB0, PRB1, PRB2, PRB3 and PRB4 |
| 5 | PRB1, PRB2, PRB3, PRB4, PRB5 and PRB6 |
| 6 | PRB2, PRB3, PRB4, PRB5, PRB6 and PRB7 |
| 7 | Reserving or introducing a new PRB position |

The PRB position in table is a negative number in Table six, which represents the PRB within a preceding narrowband corresponding to the narrowband. The PRB position greater than 5 represents the PRB within a subsequent narrowband corresponding to the narrowband.

The method described in this example may provide a more flexible resource allocation mode for narrowband PDSCH in the coverage enhancement mode B.

Example 7

This example provides a resource allocation method for flexible resource allocation of narrowband PDSCH in a coverage enhancement mode B scenario.

In the coverage enhancement mode B, 1 information bit for indicating a resource allocation state within the narrowband in a resource allocation field in DCI format 6-1B is extended into 2 bits, thereby flexibility in indicating narrowband PDSCH resource allocation state is achieved. As shown in Table 7 below:

TABLE 7

| 2-bit resource indication | PRB within a narrowband and shift offset |
|---|---|
| 0 | PRB0, PRB1, PRB2 and PRB3 (PRB0 corresponds to the first PRB within the narrowband), and the shift offset is 0 |
| 1 | PRB0, PRB1, PRB2, PRB3, PRB4 and PRB5, and the shift offset is 0 |
| 2 | PRB0, PRB1, PRB2 and PRB3, the shift offset is shifting one PRB forward |
| 3 | PRB0, PRB1, PRB2 and PRB3, the shift offset is shifting two PRBs forward |

A corresponding relationship between the resource indication (2-bit information bits) and the shift offset information as well as the PRB position within the narrowband in Table 7 is merely an example, other corresponding relationships are not listed one by one, which are also within the protection scope of this application.

The method described in this example may provide a more flexible resource allocation mode for narrowband PDSCH in the coverage enhancement mode B.

What is claimed is:

1. A resource allocation method, comprising:
    sending resource position indication information, wherein the resource position indication information carries position information of a physical resource block (PRB) resource within a narrowband and shift offset information of the PRB resource within the narrowband, or the resource position indication information carries position information of a PRB resource within the narrowband and position information of a PRB resource out of the narrowband; and
    wherein the shift offset information of the PRB resource within the narrowband comprises movement information of position of the PRB resource within the narrowband.

2. The method of claim 1, wherein sending the resource position indication information comprises:
    in a coverage enhancement mode A:
        in response to the resource position indication information is a downlink control information (DCI) format 6-0A message, indicating a resource position of a resource actually allocated to a physical uplink shared channel (PUSCH) by using a remaining state of least significant 5 bits in a resource allocation field of the resource position indication information; or
        in response to the resource position indication information is a downlink control information (DCI) format 6-1A message, indicating a resource position of a resource actually allocated to a physical downlink shared channel (PDSCH) by using the remaining state of least significant 5 bits in the resource allocation field of the resource position indication information.

3. The method of claim 1, wherein sending the resource position indication information comprises:
    in a coverage enhancement mode B: indicating a resource position of an actually allocated resource by adding one or more information bits into a resource allocation field of the resource position indication information or extending a corresponding narrowband resource allocation field in the resource allocation field of the resource position indication information.

4. The method of claim 3, wherein sending the resource position indication information comprises:
in the coverage enhancement mode B:
in response to the resource position indication information is a downlink control information (DCI) format 6-0B message, indicating a resource position of a resource actually allocated to a physical uplink shared channel (PUSCH) by adding one or more information bits into the resource allocation field of the resource position indication information or extending the corresponding narrowband resource allocation field in the resource allocation field of the resource position indication information; or
in response to the resource position indication information is the downlink control information (DCI) format 6-1B message, indicating a resource position of a resource actually allocated to a physical downlink shared channel (PDSCH) by adding one or more information bits into the resource allocation field of the resource position indication information or extending the corresponding narrowband resource allocation field in the resource allocation field of the resource position indication information.

5. The method of claim 1, wherein the shift offset information is determined according to one of:
a position of the PRB resource within the narrowband;
a system bandwidth and the position of the PRB resource within the narrowband;
a narrowband index, the system bandwidth and the position of the PRB resource within the narrowband; or
the narrowband index and the position of the PRB resource within the narrowband.

6. The method of claim 1, wherein sending the resource position indication information comprises:
in a coverage enhancement mode A:
in response to the PRB resource within the narrowband is PRB0 and PRB1, the shift offset being shifting one PRB forward; or
in response to the PRB resource within the narrowband is PRB4 and PRB5, the shift offset being shifting one PRB backward; or
in response to the PRB resource within the narrowband is PRB0, PRB1 and PRB2, the shift offset being shifting one PRB forward; or
in response to the PRB resource within the narrowband is PRB3, PRB4 and PRB5, the shift offset being shifting two PRBs backward; or
in response to the PRB resource within the narrowband is PRB0, PRB1, PRB2 and PRB3, the shift offset being shifting one PRB forward or shifting two PRBs forward; or
in response to the PRB resource within the narrowband is PRB2, PRB3, PRB4 and PRB5, the shift offset being shifting one PRB backward or shifting two PRBs backward; or
in response to the PRB resource within the narrowband is PRB0, PRB1, PRB2, PRB3, PRB4 and PRB5, the shift offset being any one of: shifting one PRB forward, shifting one PRB backward, or shifting two PRBs backward.

7. The method of claim 1, wherein sending the resource position indication information comprises:
in a coverage enhancement mode A:
the PRB resource within the narrowband being PRB0, and the PRB resource out of the narrowband being PRB5 of a preceding narrowband; or
the PRB resource within the narrowband being PRB5, and the PRB resource out of the narrowband being PRB0 of a subsequent narrowband; or
the PRB resource within the narrowband being PRB0 and PRB1, and the PRB resource out of the narrowband being PRB5 of the preceding narrowband; or
the PRB resource within the narrowband being PRB5, and the PRB resource out of the narrowband being PRB0 and PRB1 of the subsequent narrowband; or
the PRB resource within the narrowband being PRB0, PRB1 and PRB2, and the PRB resource out of the narrowband being PRB5 of the preceding narrowband; or
the PRB resource within the narrowband being PRB0 and PRB1, and the PRB resource out of the narrowband being PRB4 and PRB5 of the preceding narrowband; or
the PRB resource within the narrowband being PRB3, PRB4 and PRB5, and the PRB resource out of the narrowband being PRB0 of the subsequent narrowband; or
the PRB resource within the narrowband being PRB4 and PRB5, and the PRB resource out of the narrowband being PRB0 and PRB1 of the subsequent narrowband; or
the PRB resource within the narrowband being PRB0, PRB1, PRB2, PRB3 and PRB4, and the PRB resource out of the narrowband being PRB5 of the preceding narrowband; or
the PRB resource within the narrowband being PRB1, PRB2, PRB3, PRB4 and PRB5, and the PRB resource out of the narrowband being PRB0 of the subsequent narrowband; or
the PRB resource within the narrowband being PRB2, PRB3, PRB4 and PRB5, and the PRB resource out of the narrowband being PRB0 and PRB1 of the subsequent narrowband.

8. The method of claim 1, wherein sending the resource position indication information comprises one of the following:
in the coverage enhancement mode A, in response to a system bandwidth is 3 MHz or 5 MHz and a narrowband index is 2 or 3:
in response to the PRB resource within the narrowband is PRB0 and PRB1, the shift offset being shifting one PRB forward; or
in response to the PRB resource within the narrowband is PRB4 and PRB5, the shift offset being shifting one PRB backward; or
in response to the PRB resource within the narrowband is PRB0, PRB1, PRB2 and PRB3, the shift offset being shifting one PRB forward; or
in response to the PRB resource within the narrowband is PRB2, PRB3, PRB4 and PRB5, the shift offset being shifting one PRB backward; or
in response to the PRB resource within the narrowband is PRB0, PRB1, PRB2, PRB3, PRB4 and PRB5, the shift offset being shifting one PRB forward or shifting one PRB backward,
in the coverage enhancement mode A, in response to a system bandwidth is 10 MHz:
in response to the PRB resource within the narrowband is PRB0, PRB1 and PRB2, the shift offset being shifting one PRB forward; or
in response to the PRB resource within the narrowband is PRB3, PRB4 and PRB5, the shift offset being shifting two PRBs backward; or in response to the PRB resource within the narrowband is PRB0, PRB1, PRB2, PRB3, PRB4 and PRB5, the shift offset being shifting one PRB forward or shifting two PRBs backward.

9. The method of claim 1, wherein sending the resource position indication information comprises one of the following:
in the coverage enhancement mode A, in response to a system bandwidth is 15 MHz:
in response to a narrowband index is 0, 2 or 4, and the PRB resource within the narrowband is PRB0, PRB1, PRB2 and PRB3, the shift offset being shifting one PRB forward; or
in response to the narrowband index is 0, 2 or 4, and the PRB resource within the narrowband is PRB2, PRB3, PRB4 and PRB5, the shift offset being shifting one PRB backward; or
in response to the narrowband index is 1, 3 or 5, and the PRB resource within the narrowband is PRB0, PRB1, PRB2 and PRB3, the shift offset being shifting one PRB backward; or
in response to the narrowband index is 1, 3 or 5, and the PRB resource within the narrowband is PRB2, PRB3, PRB4 and PRB5, the shift offset being shifting one PRB forward; or
in response to the narrowband index is 6, 8 or 10, and the PRB resource within the narrowband is PRB0, PRB1 and PRB2, the shift offset being shifting one PRB forward or shifting two PRBs forward; or
in response to the narrowband index is 6, 8 or 10, and the PRB resource within the narrowband is PRB0, PRB1, PRB2 and PRB3, the shift offset being shifting two PRBs forward; or
in response to the narrowband index is 7 or 9, and the PRB resource within the narrowband is PRB2, PRB3, PRB4 and PRB5, the shift offset being shifting two PRBs backward; or
in response to the narrowband index is 11, and the PRB resource within the narrowband is PRB3, PRB4 and PRB5, the shift offset being shifting one PRB backward,
in the coverage enhancement mode A, in response to a system bandwidth is 20 MHz:
in response to a narrowband index is even, and the PRB resource within the narrowband is PRB0, PRB1 and PRB2, the shift offset being shifting one PRB forward or shifting two PRBs forward; or
in response to the narrowband index is even, and the PRB resource within the narrowband is PRB0, PRB1, PRB2 and PRB3, the shift offset being shifting two PRBs forward; or
in response to the narrowband index is odd, and the PRB resource within the narrowband is PRB3, PRB4 and PRB5, the shift offset being shifting one PRB backward or shifting two PRBs backward; or
in response to the narrowband index is odd, and the PRB resource within the narrowband is PRB2, PRB3, PRB4 and PRB5, the shift offset being shifting two PRBs backward.

10. The method of claim 1, wherein sending the resource position indication information comprises one of the following:
in a coverage enhancement mode B, in response to an actually allocated resource is a resource actually allocated to a physical uplink shared channel (PUSCH), and a system bandwidth is 3 MHz or 5 MHz:
in response to the PRB resource within the narrowband is PRB0, the shift offset being shifting one PRB forward;
in response to the PRB resource within the narrowband is PRB5, the shift offset being shifting one PRB backward;
in response to the PRB resource within the narrowband is PRB0 and PRB1, the shift offset being shifting one PRB forward or shifting one PRB backward; or
in response to the PRB resource within the narrowband is PRB2 and PRB3, the shift offset being shifting one PRB forward or shifting one PRB backward.

11. The method of claim 1, wherein sending the resource position indication information comprises one of the following:
in a coverage enhancement mode B, in response to an actually allocated resource is a resource actually allocated to a physical uplink shared channel (PUSCH), and a system bandwidth is 10 MHz:
in response to the PRB resource within the narrowband is PRB0, the shift offset being shifting one PRB forward; or
in response to the PRB resource within the narrowband is PRB5, the shift offset being shifting one PRB backward or shifting two PRBs backward,
in a coverage enhancement mode B, in response to an actually allocated resource is a resource actually allocated to a physical uplink shared channel (PUSCH), and a system bandwidth is 15 MHz:
in response to the PRB resource within the narrowband is PRB0, the shift offset being shifting one PRB forward;
in response to the PRB resource within the narrowband is PRB5, the shift offset being shifting one PRB backward; or
in response to the PRB resource within the narrowband is PRB2 and PRB3, the shift offset being shifting one PRB forward or shifting one PRB backward.

12. The method of claim 1, wherein sending the resource position indication information comprises one of the following:
in a coverage enhancement mode B, in response to an actually allocated resource is a resource actually allocated to a physical uplink shared channel (PUSCH), and a system bandwidth is 20 MHz:
in response to the PRB resource within the narrowband is PRB0, the shift offset being shifting one PRB forward or shifting two PRBs forward;
in response to the PRB resource within the narrowband is PRB5, the shift offset being shifting one PRB backward or shifting two PRBs backward; or
in response to the PRB resource within the narrowband is PRB0 and PRB1, the shift offset being shifting two PRBs forward.

13. The method of claim 1, wherein sending the resource position indication information comprises one of the following:
in a coverage enhancement mode B, in response to an actually allocated resource is a resource actually allocated to a physical downlink shared channel (PDSCH), and a system bandwidth is 3 MHz or 5 MHz:
in response to the PRB resource within the narrowband is PRB0, PRB1, PRB2 and PRB3, the shift offset being shifting one PRB forward; or in response to the PRB resource within the narrowband is PRB0, PRB1, PRB2, PRB3, PRB4 and PRB5, the shift offset being shifting one PRB forward or shifting one PRB backward.

14. The method of claim 1, wherein sending the resource position indication information comprises:
in a coverage enhancement mode B, in response to an actually allocated resource is a resource actually allocated to a physical downlink shared channel (PDSCH), and a system bandwidth is 10 MHz:
in response to the PRB resource within the narrowband is PRB0, PRB1, PRB2, PRB3, PRB4 and PRB5, the shift offset being shifting one PRB backward or shifting two PRBs backward.

15. The method of claim 1, wherein sending the resource position indication information comprises:
in a coverage enhancement mode B, in response to an actually allocated resource is a resource actually allocated to a physical downlink shared channel (PDSCH), and a system bandwidth is 15 MHz:
in response to the PRB resource within the narrowband is PRB0, PRB1, PRB2 and PRB3, the shift offset being shifting one PRB forward.

16. The method of claim 1, wherein sending the resource position indication information comprises:
in a coverage enhancement mode B, in response to an actually allocated resource is a resource actually allocated to a physical downlink shared channel (PDSCH), and a system bandwidth is 20 MHz:
in response to the PRB resource within the narrowband is PRB0, PRB1, PRB2 and PRB3, the shift offset being shifting two PRBs forward.

17. The method of claim 1, further comprising:
determining a position of an actually allocated resource according to the position information of the PRB resource within the narrowband and the shift offset information of the PRB resource within the narrowband; or
determining the position of the actually allocated resource according to the position information of the PRB resource within the narrowband and the position information of the PRB resource out of the narrowband.

18. A resource allocation device, comprising a processor and a storage device, wherein the storage device stores processor-executable programs, and the programs comprise:
an information sending module, which is configured to send resource position indication information, wherein the resource position indication information carries position information of a physical resource block (PRB) resource within a narrowband and shift offset information of the PRB resource within the narrowband, or the resource position indication information carries position information of the PRB resource within the narrowband and position information of a PRB resource out of the narrowband; and the shift offset information of the PRB resource within the narrowband comprises movement information of position of the PRB resource within the narrowband;
a resource allocation module, which is configured to determine a position of an actually allocated resource according to the position information of the PRB resource within the narrowband carried in the resource position indication information and the shift offset information of the PRB resource within the narrowband carried in the resource position indication information; or determine a position of an actually allocated resource according to position information of the PRB resource within the narrowband and the position information of the PRB resource out of the narrowband carried in the resource position indication information.

19. A resource allocation device, comprising:
a memory, a processor, and a resource allocation program stored in the memory and executable on the processor, wherein the resource allocation program, when executed by the processor, implements the resource allocation method of claim 1.

20. A non-transitory computer-readable storage medium storing a resource allocation program, wherein the resource allocation program, when executed by a processor, implements the resource allocation method of claim 1.

* * * * *